United States Patent
Kulkarni et al.

(10) Patent No.: US 10,162,730 B2
(45) Date of Patent: Dec. 25, 2018

(54) SYSTEM AND METHOD FOR DEBUGGING SOFTWARE IN AN INFORMATION HANDLING SYSTEM

(71) Applicant: DELL PRODUCTS, L.P., Round Rock, TX (US)

(72) Inventors: Yogesh P. Kulkarni, Round Rock, TX (US); Santosh K. Bidaralli, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/413,725

(22) Filed: Jan. 24, 2017

(65) Prior Publication Data

US 2018/0210810 A1    Jul. 26, 2018

(51) Int. Cl.
G06F 9/44 (2018.01)
G06F 11/36 (2006.01)

(52) U.S. Cl.
CPC ...... *G06F 11/3624* (2013.01); *G06F 11/3692* (2013.01)

(58) Field of Classification Search
CPC .................................. G06F 11/3624
USPC .................................. 717/123–129
See application file for complete search history.

(56) References Cited

U.S. PATENT DOCUMENTS

| | | | | | |
|---|---|---|---|---|---|
| 5,465,258 | A | * | 11/1995 | Adams ............... | G06F 11/3466 714/35 |
| 5,768,563 | A | * | 6/1998 | Porter ............... | G06F 8/60 703/27 |
| 6,026,362 | A | * | 2/2000 | Kim .................. | G06F 11/3664 705/317 |
| 6,167,358 | A | * | 12/2000 | Othmer ............... | G06F 11/0748 702/188 |
| 6,715,139 | B1 | * | 3/2004 | Kodosky ............... | G06F 8/34 717/124 |
| 7,047,521 | B2 | * | 5/2006 | Bunnell ............... | G06F 11/3466 714/E11.2 |

(Continued)

OTHER PUBLICATIONS

Dhamdhere et al, "Dynamic Currency Determination in Optimized Programs", ACM Transactions on Programming Languages and Systems, vol. 20, No. 6, pp. 1111-1130, 1998.*

(Continued)

*Primary Examiner* — Anil Khatri
(74) *Attorney, Agent, or Firm* — Isidore PLLC

(57) ABSTRACT

A method of debugging software code in an information handling system (IHS) is disclosed. The method includes establishing communications between a debug computer and a target computer and triggering the target computer to collect and transmit a plurality of symptom and root cause (SARC) values associated with the software code. The SARC values are compared to SARC reference values associated with the software code. The method further includes determining if the SARC values meet the requirements of the SARC reference values. In response to the SARC values not meeting the requirements of the SARC reference values, at least one process associated with the SARC values that do not meet the requirements of the SARC reference values is identified. Process data corresponding to the at least one process is collected and a SARC diagnosis report is generated for the software code based on the process data.

17 Claims, 6 Drawing Sheets

(56) References Cited

U.S. PATENT DOCUMENTS

| | | | | |
|---|---|---|---|---|
| 7,131,114 | B2* | 10/2006 | Nguyen | G06F 11/362 717/129 |
| 7,322,026 | B2* | 1/2008 | Ahluwalia | G06F 11/3672 714/E11.207 |
| 7,490,319 | B2* | 2/2009 | Blackwell | G06F 11/3664 717/124 |
| 8,146,056 | B1* | 3/2012 | Liu | G06F 11/3636 714/34 |
| 8,166,459 | B2* | 4/2012 | Suenbuel | G06F 11/366 714/25 |
| 8,468,502 | B2* | 6/2013 | Lui | G06F 11/3636 717/125 |
| 8,584,097 | B2* | 11/2013 | Lindahl | G06F 11/3636 717/128 |
| 8,624,708 | B2* | 1/2014 | Chang | G06K 7/0008 340/10.1 |
| 8,966,453 | B1* | 2/2015 | Zamfir | G06F 11/3604 714/38.1 |
| 9,244,815 | B2 | 1/2016 | Wisniewski | |
| 9,471,456 | B2 | 10/2016 | Bartinkowski et al. | |
| 2015/0370686 | A1 | 12/2015 | Margalit et al. | |

OTHER PUBLICATIONS

Akgul et al, "Assembly Instruction Level Reverse Execution for Debugging ", ACM Transactions on Software Engineering and Methodology, vol. 13, No. 2, pp. 149-198, 2004.*

Dalal et al, "Empirical Study of Root Cause Analysis of Software Failure", ACM SIGSOFT Software Engineering Notes, p. 1, vol. 38, No. 4, pp. 1-7, 2013.*

Sahoo et al, "Using Likely Invariants for Automated Software Fault Localization", ACM, pp. 139-151, 2013.*

Ko et al, "Finding Causes of Program Output with the Java Whyline", ACM, pp. 1569-1578, 2009.*

Nikolik, "Convergence Debugging", ACM, pp. 89-98, 2005.*

* cited by examiner

| WSMAN 610 | SARC Ref. Values 237 | SARC values 268 | |
|---|---|---|---|
| c1 Number PT 612 | 5 | 5 | |
| c2 Number TT 614 | 2 | 8 | ← Problem |
| r1 Timeout 60 sec. for every TT 616 | Pass | Pass | |

SYSTEM AND METHOD FOR DEBUGGING SOFTWARE IN AN INFORMATION HANDLING SYSTEM

BACKGROUND

1. Technical Field

The present disclosure generally relates to information handling systems and in particular to a system and method for debugging software in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When software is created, written and updated, it may need to be debugged in order to ensure proper operation. Sometimes, software source code can contain errors, problems, or bugs that cause the software to not function correctly when the software is compiled and/or executed. In order for the software code to function properly, these bugs can require identification and correction by an engineer or programmer through the process of debugging. Debugging can be assisted by the use of a computer based tools and programs, which are called debuggers. A debugger is a software application that a user can use to help with debugging software code. A debugger can contain tools that help the programmer in the debugging process.

BRIEF SUMMARY

Disclosed are a method of and an information handling system (IHS) and a computer program product for debugging software code in an IHS.

According to one embodiment, the method of debugging software code in an IHS includes establishing communications between a debug computer and a target computer and triggering the target computer to collect and transmit to the debug computer a plurality of symptom and root cause (SARC) values associated with the software code. The SARC values are compared to SARC reference values associated with the software code. The method further includes determining if the SARC values meet the requirements of the SARC reference values. In response to the SARC values not meeting the requirements of the SARC reference values, at least one process associated with the SARC values that do not meet the requirements of the SARC reference values is identified. Process data corresponding to the at least one process is collected and a SARC diagnosis report is generated for the software code based on the process data.

According to another embodiment, the IHS includes a processor that is communicatively coupled to a system memory. The processor has firmware executing thereon to enable debugging software code in the IHS. The firmware configures the processor to establish communications between a debug computer and a target computer via a communication network and to trigger the target computer to collect and transmit a plurality of symptom and root cause (SARC) values associated with the software code. The SARC values are compared to SARC reference values associated with the software code. The firmware further configures the processor to determine if the SARC values meet the requirements of the SARC reference values. In response to the SARC values not meeting the requirements of the SARC reference values, at least one process associated with the SARC values that do not meet the requirements of the SARC reference values is identified. Process data corresponding to the at least one process is collected and a SARC diagnosis report is generated for the software code based on the process data.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
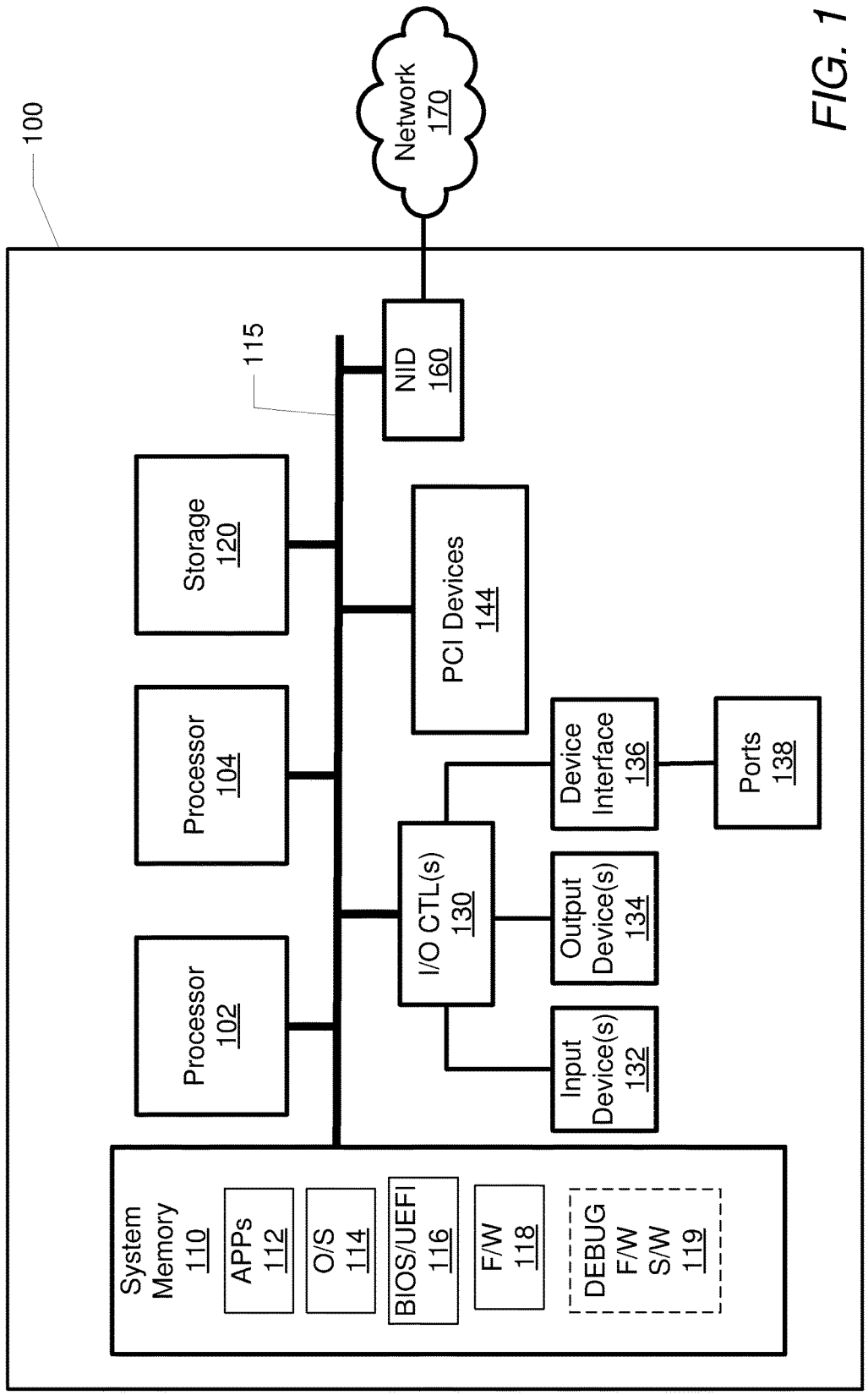
FIG. 1 illustrates an example information handling system within which various aspects of the disclosure can be implemented, according to one or more embodiments.

The illustrative embodiments provide a method, an information handling system (IHS) and a computer program product for debugging software code in an IHS. The method includes establishing communications between a debug computer and a target computer and triggering the target computer to collect and transmit a plurality of symptom and root cause (SARC) values associated with the software code. The SARC values are compared to SARC reference values associated with the software code. The method further includes determining if the SARC values meet the requirements of the SARC reference values. In response to the SARC values not meeting the requirements of the SARC reference values, at least one process associated with the SARC values that do not meet the requirements of the SARC reference values is identified. Process data corresponding to the at least one process is collected and a SARC diagnosis report is generated for the software code based on the process data.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example debug IHS 100 includes one or more processors, such as processor 102 and 104. Processors G102 and 104 are coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of debug IHS 100. As shown, system memory 110 can include therein a plurality of software and/or firmware modules including application(s) 112, operating system (O/S) 114, basic input output system/unified extensible firmware interface (BIOS/UEFI) 116 and firmware (F/W) 118. In one or more embodiments, BIOS/UEFI image 116 comprises the additional functionality associated with UEFI and can include UEFI images and drivers. System memory 110 can optionally include therein debug software (S/W) and/or firmware (F/W) 119 that functions to debug software code. The various software and/or firmware modules have varying functionality when their corresponding program code is executed by processors 102 and/or 104 or other processing devices within debug IHS 100.

Debug IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136 are coupled to I/O controllers 130. Examples of device interfaces 136 include an optical reader, a universal serial bus (USB), a card reader, Personal Computer Memory Card International Association (PCMIA) slot, and/or a high-definition multimedia interface (HDMI). Device interfaces 136 can also include general purpose I/O interfaces such as $I^2C$, SMBus, and peripheral component interconnect (PCI) buses. Device interface(s) 136 can be utilized to enable data communication via one or more ports 138. Ports 138 can provide a connection point for connecting another device to be debugged to debug IHS 100.

Debug IHS 100 further includes one or more peripheral component interconnect (PCI) devices 144 which are coupled to system interconnect 115. In one embodiment, PCI devices 144 can include graphic processing units and storage devices, such as solid state drives.

Debug IHS 100 further comprises a network interface device (NID) 160. NID 160 enables debug IHS 100 to communicate and/or interface with other devices, services, and components that are located external to debug IHS 100. These devices, services, and components can interface with debug IHS 100 via an external communication network, such as example network 170, using one or more communication protocols. In one embodiment, a customer provisioned system/platform can comprises multiple devices located across a distributed network, and NID 160 enables debug IHS 100 to be connected to these other devices. Network 170 can be a local area network, wide area network, personal area network, and the like, and the connection to and/or between network and debug IHS 100 can be wired or wireless or a combination thereof. For purposes of discussion, Network 170 is indicated as a single collective component for simplicity. However, it is appreciated that network 170 can comprise one or more direct connections to other devices as well as a more complex set of interconnections as can exist within a wide area network, such as the Internet.

Figure 2:
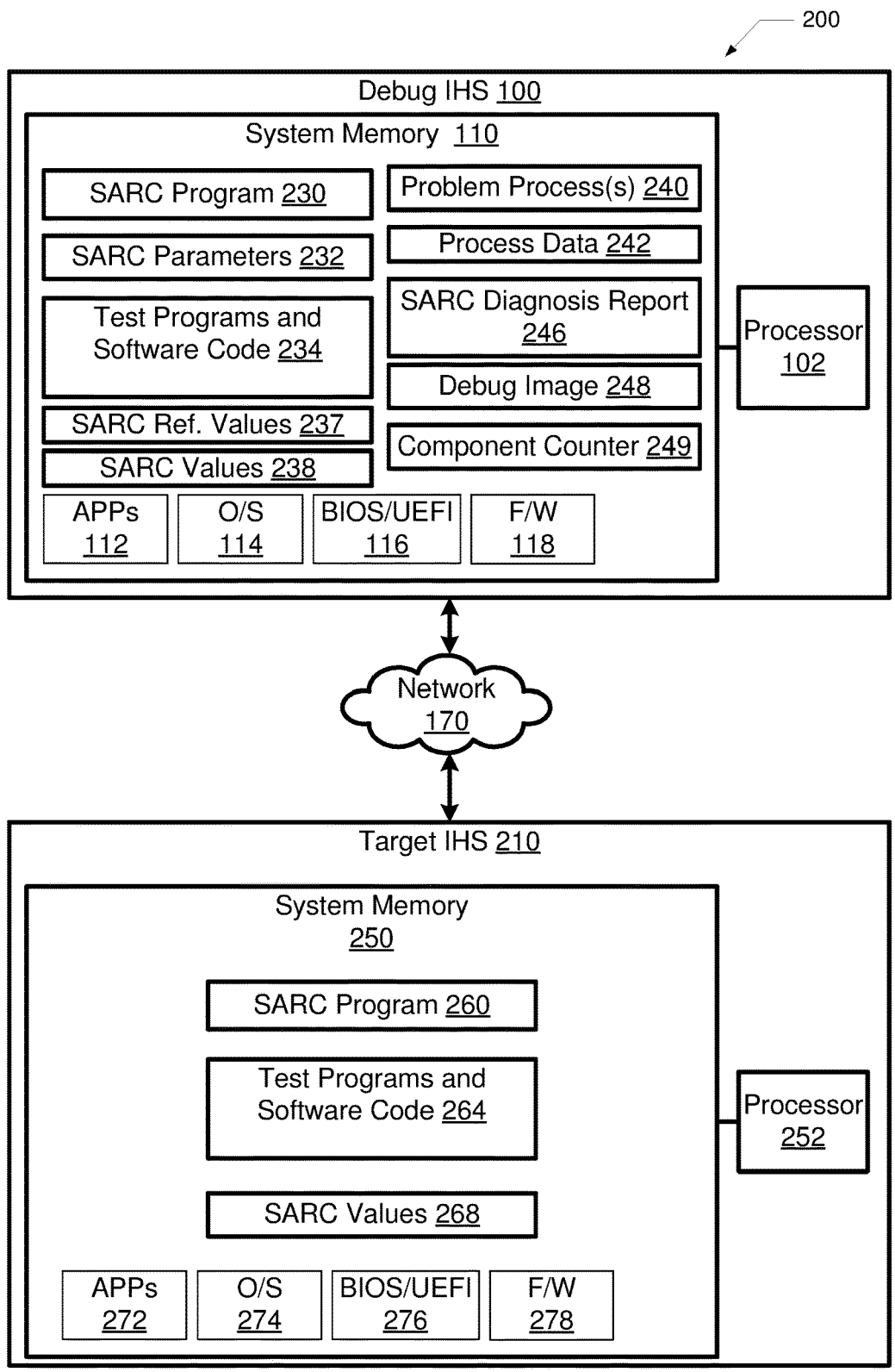
FIG. 2 illustrates an example block diagram of a distributed computing environment used in debugging software code, according to one or more embodiments.

Referring to FIG. 2, one embodiment of a distributed computing environment 200 is shown. Distributed computing environment 200 comprises a debug computer, which is presented as debug IHS 100 of FIG. 1, and a target computer, target IHS 210. In one embodiment, target IHS 210 can also have an architecture that is similar to IHS 100 of FIG. 1, but configured with different functional firmware and/or software. Throughout the rest of the description, debug computer is referred to as debug IHS 100. In the illustrative embodiment, debug IHS 100 and target IHS 210 are communicatively coupled via communication network 170. In one embodiment, debug IHS 100 and target IHS 210 can also be communicatively coupled via a serial bus using ports 138 (FIG. 1). Debug IHS 100 includes processor 102 that is in communication with system memory 110. As shown, system memory 110 includes application(s) 112, O/S 114, BIOS/UEFI 116 and F/W 118. System memory 110 further includes symptom and root cause (SARC) program 230, SARC parameters 232, test programs 234, SARC reference values 237, SARC values 238, problem process(es) 240, process data 242, SARC diagnosis report 246, debug image 248, and component counter 249.

SARC program 230 functions on debug IHS 100 to debug software problems of other connected devices by identifying processes that do not meet the requirements of pre-determined SARC reference values. SARC parameters 232 contain the pre-determined parameters that SARC program 230 uses to identify problem processes from which process data is collected. Test programs and software code 234 are identified by a user as having a potential or intermittent problem or issue. SARC reference values 237 are pre-determined values for the SARC parameters 232 that correspond to expected values from test programs and software code 234. SARC values 238 are data and values that the target IHS 210 collects during the execution of test programs 230 and transmits to debug IHS 100. These values are compared to the pre-determined SARC reference values 239 to identify processes that are potentially the source of software bugs. Problem process(es) 240 are processes within test programs and software code 234 that are potentially the source of software bugs. Process data 242 contains information about the problem processes and associated SARC values. Process data 242 can include information such as state, status, number of threads, memory information, backtrace data, local variables, and other information. SARC diagnosis report 246 contains information about the test programs 234, SARC values 238, problem process(s) 240, and process data 242. Debug image 248 is a pre-defined image for the firmware version on which the issue or problem is observed. Debug image 248 is used during debugging by SARC program 230. Component counter 249 is used during checking of all of the components of processes that have been identified as having a problem.

Target IHS 210 includes processor 252 that is in communication with system memory 250. As shown, system memory 250 includes application(s) 272, O/S 274, BIOS/UEFI 276 and F/W 278. System memory 250 further includes symptom and root cause (SARC) program 260, test programs 264, and SARC values 268.

SARC program 260 functions on target IHS 210 to collect SARC values 268 and process data from the processes. Test programs and software code 264 are programs and software code that a user has identified as having a potential or intermittent problem or issue. SARC values 268 are data and values that the target IHS 210 collects during the execution of test programs 260 and transmits to debug IHS 100.

In one embodiment, processor 102 establishes communications between debug IHS 100 and target IHS 210 via communication network 170 or via other connection devices/components such as ports 138. Debug IHS 100 triggers target IHS 210 to run test programs 264 and to collect and transmit SARC values 268 associated with the software code 264. Debug IHS 100 stores the received SARC values as SARC values 238. Debug IHS 100 compares the SARC values 238 to the SARC reference values 237. Debug IHS 100 determines if the SARC values 238 meet the requirements (i.e. have acceptable values that are either equal to or within a pre-determined range) of the SARC reference values 237. In response to the SARC values 238 not meeting the requirements of the SARC reference values 237, Debug IHS 100 identifies problem process(s) 240 associated with the SARC values that do not meet the requirements of the SARC reference values. Debug IHS 100 collects processes data 242 corresponding to the problem process(s) 240 and generates SARC diagnosis report 246 for the software code based on the process data.

Those of ordinary skill in the art will appreciate that the hardware and software/firmware components and basic configuration depicted in FIGS. 1 and 2 and described herein may vary. For example, the illustrative components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure. In one embodiment, SARC program 230 can solely function on target IHS 210 to debug software problems.

Figures 3, 6:
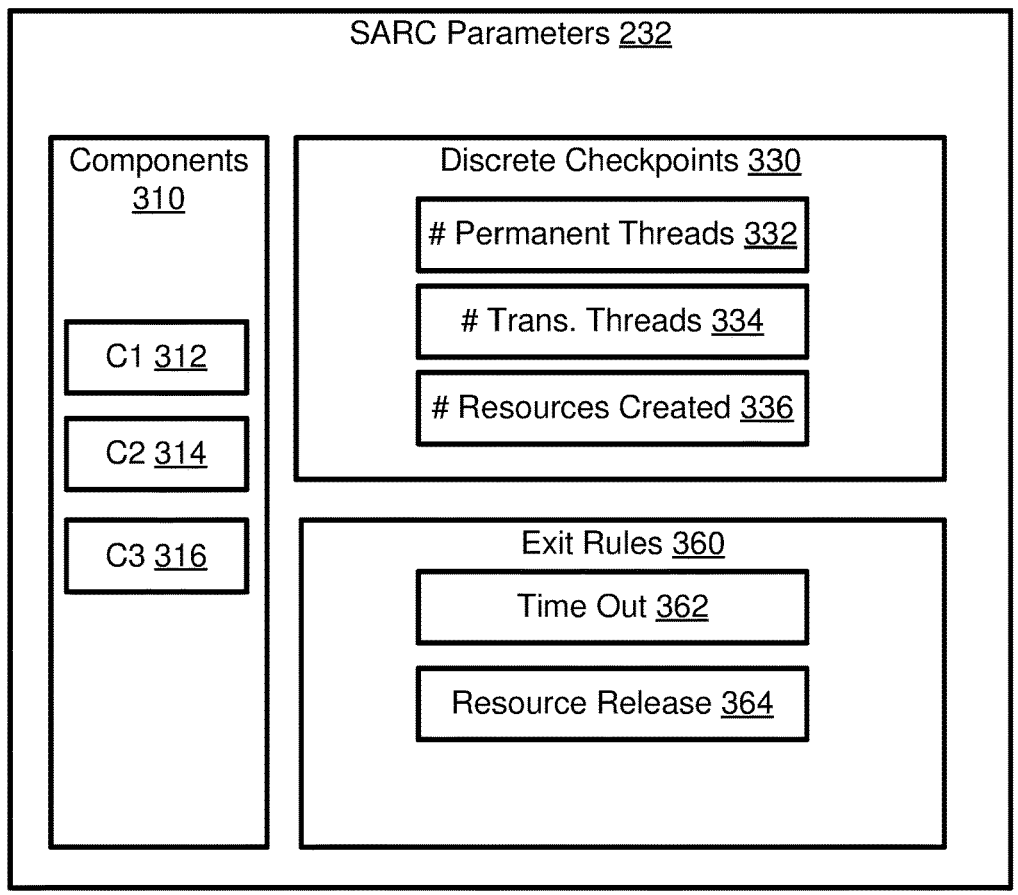
FIG. 3 illustrates additional details of the SARC parameters, according to one or more embodiments.
FIG. 6 illustrates an example table of SARC reference values and SARC values according to one or more embodiments.

FIG. 3 illustrates details of SARC parameters 232. SARC parameters 232 are pre-defined by a user. SARC parameters 232 include several system components (n) 310, several discrete checkpoints (c) 330 and several exit rules (r) 360. An example of a component is a unix standard process or a daemon running on an IHS. The discrete checkpoints (c) 330 can include a number of permanent threads (pt) 332, a number of transactional threads (tt) 334, and a number of resources created (rc) 336. For indefinite transactional threads, the value of transactional threads (tt) 334 is −1. An example of resources created (rc) 336 are files, shared memory, named inter-process communications (IPCs), memory consumption and processor utilization. Exit rules (r) 360 can include time out rule (to) 362 and resource release (rr) rule 364. An example of time out rule (to) 362 is a thread timeout. An example of a resource release (rr) rule 364 is a file deletion, a shared memory release or CPU utilization above a certain percentage.

One example of SARC parameters 232 is illustrated below. Example SARC parameters 232 include N system components with a subset (n) of the system components defined as:

$$N1=\{n1, n2, n3\}$$

SARC parameters 232 further include C discrete checkpoints with a subset (c) of the discrete checkpoints for each member of N1 defined as:

$$C1=f(n1, c)=\{pt=2, tt=3\}$$

The discrete checkpoint (C1) above includes 2 permanent threads and up to 3 transactional threads at any time.

$$C2=f(n2, c)=\{pt=0, tt=-1\}$$

The discrete checkpoint (C2) above includes 0 permanent threads and no limit on the number of transactional threads as indicated by the −1 value.

$$C3=f(n3, c)=\{pt=5, tt=0\}$$

The discrete checkpoint (C3) above includes 5 permanent threads and 0 transactional threads.

SARC parameters 232 further include R exit rules with a subset of the exit rules defined per the corresponding discrete checkpoint.

$$R1=f(C1, r)=\{to\ for\ tt=60s, rr=\text{file delete"/var/run/tmpfile"}\}$$

The resource release rules (R1) above include every transactional thread has a timeout of 60 seconds, and the resource file "/var/run/tmpfile" should be deleted at the exit of the transactional thread.

$$R2=f(C2, r)=\{to\ for\ tt=60s, rr=\text{file delete"/var/run/tmpfile"}\}$$

The resource release rules (R2) above include every transactional thread has a timeout of 60 seconds, and the resource file "/var/run/tmpfile" should be deleted at the exit of the transactional thread.

$$R3=f(C3, r)=\{rr=\text{CPU utilization}\}$$

The resource release rules (R3) above include the resource CPU utilization of n3 with 5 permanent threads. The CPU utilization to pass is 5 percent or less CPU utilization.

After the SARC parameters 232 are defined for a specific set of components, target IHS 210, executing SARC program 260, can use the SARC parameters 232 as search inputs to collect SARC values 268 from test programs 264. The collected SARC values 238 are compared to the SARC reference values 237 to allow debugging by debug IHS 100 of software in target IHS 210. In one embodiment, SARC programs 230 and 260 can each be implemented as an application/daemon. The SARC programs, running as daemons/scripts, may take inputs from a configuration file, command line arguments, or another script file. In another embodiment, SARC programs 230 and 260 can be implemented as a script in combination with gnu debugger (GDB) software and GDB server.

Figure 4A:
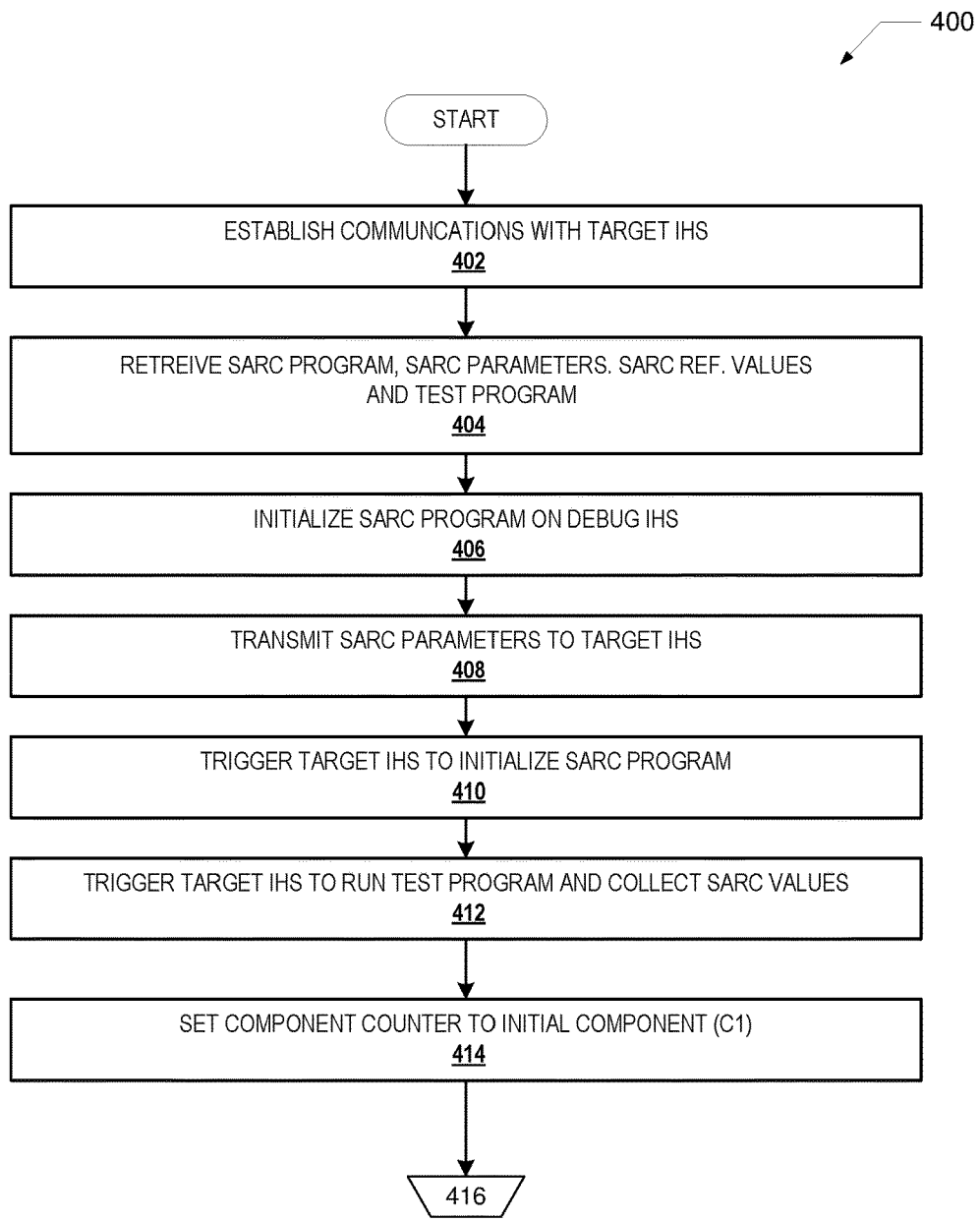
FIGS. 4A and 4B are a flow chart illustrating one example of a method performed by a debug information handling system for debugging software in an information handling system, according to one embodiment.
Figure 4B:
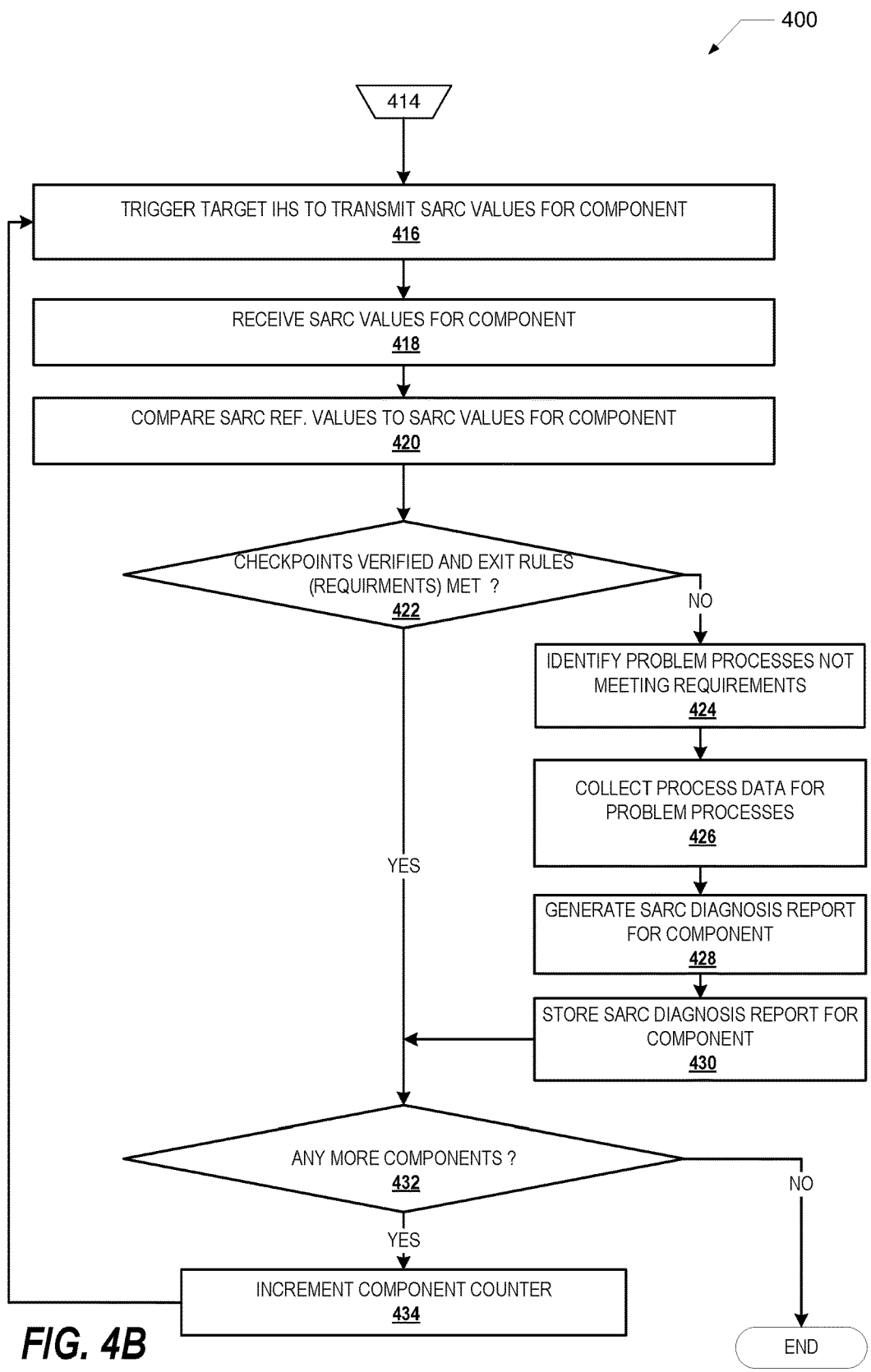
Figure 5:
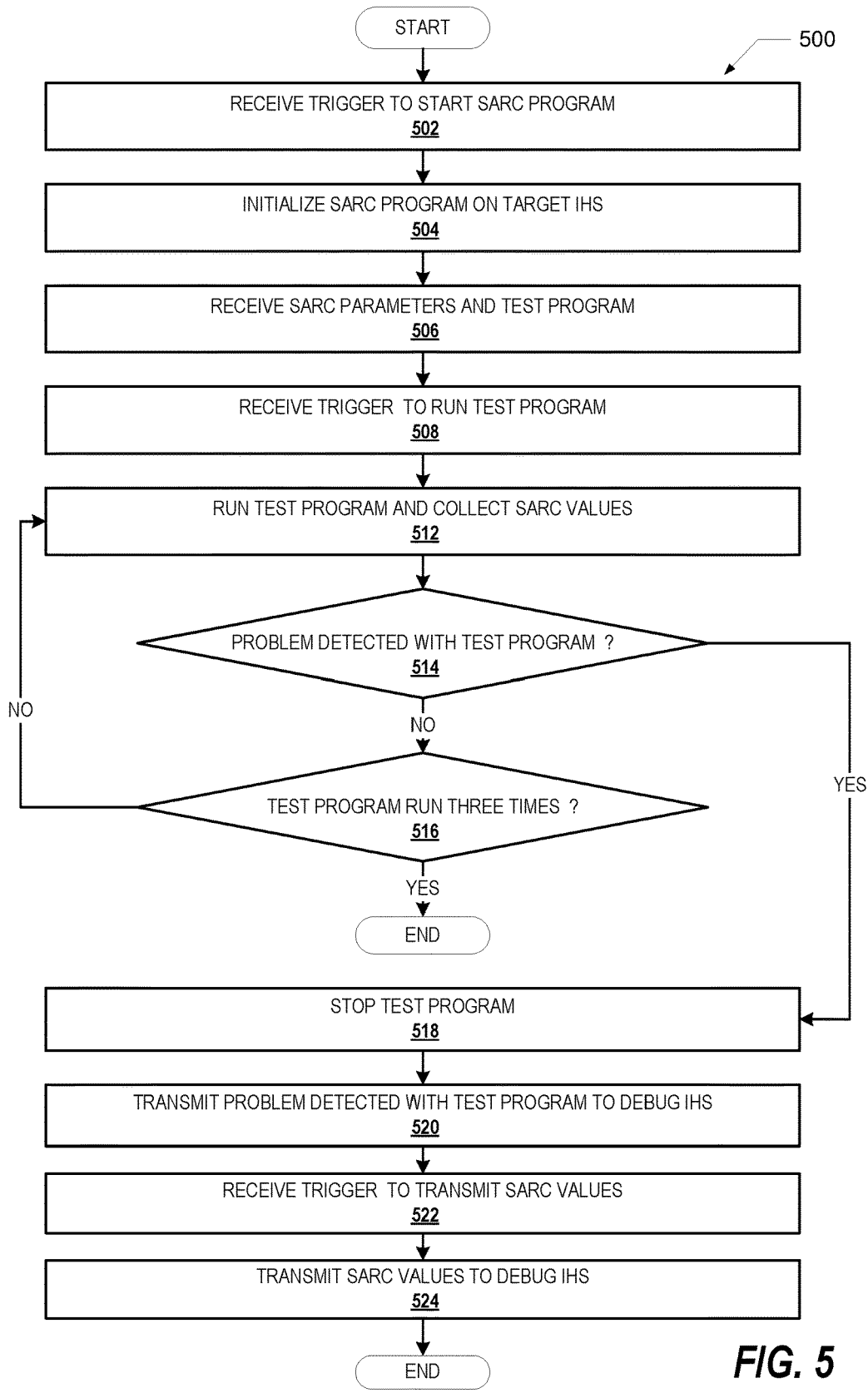
FIG. 5 is a flow chart illustrating another example of a method performed by a target information handling system for debugging software in the target information handling system, according to one embodiment.

FIGS. 4A, 4B and 5 illustrate flowcharts of exemplary methods 400 and 500 by which debug IHS 100 and target IHS 210 within the preceding figures performs different aspects of the processes that enable the one or more embodiments of the disclosure. Generally, method 400 represents a method performed by debug IHS 100 for debugging software in an IHS. Method 500 represents a method performed by target IHS 210 for collecting information from execution of a test program to aid in debugging software in the target IHS. The description of methods 400 and 500 is provided with general reference to the specific components illustrated within the preceding FIGS. 1-3. Generally, method 400 is described as being implemented via processor 102 and particularly by the execution of SARC program 230 by processor 102. Method 500 is described as being implemented via processor 252 and particularly by the execution of SARC program 260 by processor 252. It is however appreciated that certain aspects of the described methods may be implemented via other processing devices and/or execution of other code.

Referring now to the flow chart of FIG. 4A, method 400 begins at the start block and proceeds to block 402 where processor 102 establishes communications with target IHS 210 via communications network 170 computer using a network protocol. Processor 102 retrieves, from system memory 110, the SARC parameters 232, SARC reference values 237, SARC program 230 and test programs 234 (block 404) and initializes SARC program 230 on debug IHS 100 (block 406). Processor 102 transmits the SARC parameters 232 to the target IHS 210 using a communication protocol (block 408) and triggers the target IHS 210 to initialize SARC program 260 (block 410). In one embodiment, the initialization of SARC program 260 is triggered by sending a proprietary command to the target IHS 210. Processor 102 triggers the target IHS 210 and processor 252 to execute (or run) the test programs 264 and to collect the SARC values 268 corresponding to the SARC parameters 232 (block 412). Processor 102 initializes or sets a component counter 249 for the first component (C1) (block 414).

Turning to FIG. 4B, Processor 102 triggers target IHS 210 to transmit the SARC values 268 for the current component of the software code (block 416), and processor 102 receives the SARC values 268 from target IHS 210 for the current component (block 418). Processor 102 compares the SARC values 268 for the current component to the SARC reference values 237 for the current component (block 420). At decision block 422, processor 102 determines if the SARC values 268 meet the requirements (i.e. match the values or exit rules) of the SARC reference values 237 for the current component. For the current component, the SARC values for the checkpoints are verified and the requirements of the exit rules are checked.

In response to the SARC values not meeting the requirements of the SARC reference values, processor 102 identifies at least one problem process 240 of test programs 234 that are associated with the current component (block 424). Processor 102 collects process data 242 corresponding to the problem process 240 (block 426). Processor 102 generates a SARC diagnosis report 246 for the current component based on the SARC values 268, problem process 240 and process data 242 (block 428). Processor 102 stores the SARC diagnosis report 246 for the current component to system memory 110 (block 430).

After storing the SARC diagnosis report 246 (block 430) or in response to the SARC values meeting the requirements of the SARC reference values (decision block 422), processor 102 determines if there are any more components remaining that require verifying the SARC values 268 to the SARC reference values 237 (decision block 432). In response to determining that there are no more components remaining that require comparing the SARC values 268 to the SARC reference values 237, method 400 terminates. In response to determining that there are more components remaining that require verifying the SARC values 268 to the SARC reference values 237, processor 102 increments the component counter 249 for the next component (i.e. C2, if necessary) (block 434) and method 400 returns to block 416 where processor 102 continues to trigger target IHS 210 to transmit the SARC values 268 for the current component of the software code.

Referring now to the flow chart of FIG. 5, method 500 begins at the start block and proceeds to block 502 where processor 252 receives a trigger from debug IHS 100 to start and/or initialize SARC program 260. Processor 252 initializes the SARC program 260 on target IHS 210 (block 504). Processor 252 receives the SARC parameters and test programs from debug IHS 100 (block 506). Processor 252 receives a trigger from debug IHS 210 to execute (or run) the test programs 234 (block 508) and to collect the SARC values 268 corresponding to the SARC parameters 232 (block 510). At decision block 514, processor 252 determines if a problem has been detected with the test programs and their associated software code. The SARC algorithm running inside SARC program 260 on target IHS 210 determines if one or more conditions defined in the SARC parameters did not meet the SARC values. If the values do not match, a problem is logged. In response to determining that a problem has not been detected with the test programs and their associated software code, processor 252 determines if the test programs have been executed or run three times (decision block 516). The test program is run three times in an attempt to reproduce an intermittent bug in the test programs. In response to determining that the test programs have not been executed or run three times, processor 252 returns to block 512 and continues to execute or run the test programs 234 and collect the SARC values 268 corresponding to the SARC parameters 232. In response to determining that the test programs have been executed or run three times, method 500 ends.

In response to determining at decision block 514 that a problem has been detected with the test programs and their associated software code, processor 252 stops the test programs (block 518) and transmits a message to debug IHS 100 that a problem with the test programs has been detected (block 520). Processor 252 receives a trigger from debug IHS 100 to transmit the SARC values 268 for at least one component of the software code (block 522), and processor 252 transmits the SARC values 268 to debug IHS 100 (block 524).

Methods 400 and 500 can be used to debug software in an IHS by identifying threads and processes that have problems. For example, an issue is reported in a WINDOWS management (WSMAN) object where the WSMAN commands stopped working. The WSMAN object provides methods and properties used to create a session represented by a session object. The WSMAN commands returned a timeout error for a specified duration (3-4 hour window). The root cause of the issue was a "wsmand" component in the WSMAN stack had entered a deadlock by locking on a mutex that is acquired and not released by another thread. A mutex is a program object that allows multiple program threads to share the same resource. This deadlock resulted in every WSMAN transaction after the deadlock creating a transactional thread that was locked on the mutex forever. As a result, the number of transactional threads kept on increasing by consuming additional memory. The memory monitoring thread detects a memory usage threshold that was reached by that process after 3-4 hours and restarted the child process, thereby destroying all the threads along with the mutex.

FIG. 6 illustrates an example table 600 of SARC reference values 237 and SARC values 268 for a wsman component 610. Table 600 includes a first checkpoint (c1) for the number of permanent threads 612, a second checkpoint (c2) for the number of transactional threads 614 and a release rule (r1) 616 of a timeout after 60 seconds for every transactional thread. C1 612 has an expected SARC reference value of 5 and a detected SARC value of 5. C1 614 has an expected SARC reference value of 2 and a detected SARC value of 8. R1 616 has an expected SARC reference value of pass and a detected SARC value of pass. Because the SARC value of "8" of checkpoint C1 614 does not match the expected SARC reference r value of "2", a problem can be identified with the wsman component. In this example, methods 400 and 500 are able to discover the problem process within the WSMAN stack by identifying the increased number of transactional threads in the SARC values 268 that did not match the comparison to the number of transactional threads as defined in SARC reference values 237.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of debugging software code in an information handling system (IHS), the method comprising:
    establishing, by a processor of a debug computer, communications between the debug computer and a target computer via a communications network:
    retrieving, via the debug computer, a plurality of symptom and root cause (SARC) parameters, a SARC program, and
    a test program containing the software code:
    transmitting, via the communications network, the SARC parameters and the test program to the target computer:
    triggering the target computer to run the test program;
    triggering the target computer to initialize the SARC program on the target computer;
    triggering the target computer to collect and transmit, to the debug computer via the communications network, a plurality of SARC values associated with the software code executing on the target computer;
    comparing, by the processor of the debug computer, the SARC values to a plurality of SARC reference values associated with the software code;
    determining if the SARC values meet requirements of the SARC reference values; in response to the SARC values not meeting the requirements of the SARC reference values,
    identifying at least one process associated with the SARC values that do not meet the requirements of the SARC reference values;
    collecting process data corresponding to the at least one process executing at the target computer; and
    generating and outputting a SARC diagnosis report for the software code based on the process data.

2. The method of claim 1, further comprising:
    determining if the target computer has detected a problem with the software code; and
    in response to determining that the target computer has detected a problem with the software code, stopping the test program.

3. The method of claim 1, further comprising:
    storing the SARC diagnosis report to a system memory.

4. The method of claim 1, wherein the SARC parameters include at least one of (i) a plurality of components, (ii) a plurality of discrete checkpoints, and (iii) a plurality of exit rules.

5. The method of claim 4, wherein the plurality of discrete checkpoints comprise a number of permanent threads, a number of transitory threads, and a number of resources created.

6. The method of claim 4, wherein the plurality of exit rules comprise a timeout rule and a resource release rule.

7. An information handling system (IHS) comprising:
a network interface device; and
a processor communicatively coupled to a system memory and to the network interface device, the processor having firmware executing thereon to enable debugging software code in the IHS, wherein the firmware configures the processor to operate as a debug computer and to:
establish communications between the debug computer and a target computer via a communication network;
retrieve a plurality of symptom and root cause (SARC) parameters, a SARC program and a test program containing the software code;
transmit the SARC parameters and the test program to the target computer via the communication network;
trigger the target computer to run the test program;
trigger the target computer to initialize the SARC program on the target computer;
trigger the target computer to collect and transmit a plurality of SARC values associated with the software code;
compare the SARC values to a plurality of SARC reference values associated with the software code;
determine if the SARC values meet the requirements of the SARC reference values;
in response to the SARC values not meeting the requirements of the SARC reference values,
identify at least one process associated with the SARC values that do not meet the requirements of the SARC reference values;
collect process data corresponding to the at least one process; and
generate and output a SARC diagnosis report for the software code based on the process data.

8. The information handling system of claim 7, wherein the firmware further configures the processor to:
determine if the target computer has detected a problem with the software code; and in response to determining that the target computer has detected a problem with the software code, stop the test program.

9. The information handling system of claim 7, wherein the firmware further configures the processor to:
store the SARC diagnosis report to a system memory.

10. The information handling system of claim 7, wherein the SARC parameters include at least one of (i) a plurality of components, (ii) a plurality of discrete checkpoints and (iii) a plurality of exit rules.

11. The information handling system of claim 10, wherein the plurality of discrete checkpoints comprise a number of permanent threads, a number of transitory threads and a number of resources created.

12. The information handling system of claim 10, wherein the plurality of exit rules comprise a timeout rule and a resource release rule.

13. A computer program product comprising:
a non-transitory computer readable storage device; and
program code stored on the computer readable storage device that, when executed by a processor operating within a debug computer that is communicatively connected to a target computer, configures the processor to:
establish, over a communications network, communications between the debug computer and the target computer via a network interface device of the target computer;
retrieve a plurality of symptom and root cause (SARC) parameters, a SARC program and a test program containing the software code;
transmit the SARC parameters and the test program to the target computer via the communications network;
trigger the target computer to run the test program;
trigger the target computer to initialize the SARC program on the target computer;
trigger the target computer to collect and transmit a plurality of SARC values associated with the software code;
compare the SARC values to a plurality of SARC reference values associated with the software code;
determine if the SARC values meet the requirements of the SARC reference values;
in response to the SARC values not meeting the requirements of the SARC reference values,
identify at least one process associated with the SARC values that do not meet the requirements of the SARC reference values;
collect process data corresponding to the at least one process executing at the target computer; and
generate and output a SARC diagnosis report for the software code based on the process data.

14. The computer program product of claim 13, wherein the code, when executed by the processor, further configures the processor to:
determine if the target computer has detected a problem with the software code; and in response to determining that the target computer has detected a problem with the software code, stop the test program.

15. The computer program product of claim 13, wherein the code, when executed by the processor, further configures the processor to:
store the SARC diagnosis report to a system memory.

16. The computer program product of claim 13, wherein the SARC parameters include at least one of (i) a plurality of components, (ii) a plurality of discrete checkpoints and (iii) a plurality of exit rules.

17. The computer program product of claim 16, wherein the plurality of discrete checkpoints comprise a number of permanent threads, a number of transitory threads and a number of resources created.

* * * * *